US009756513B2

(12) United States Patent
Sandberg et al.

(10) Patent No.: US 9,756,513 B2
(45) Date of Patent: Sep. 5, 2017

(54) METHODS AND RADIO ACCESS NODE FOR DETERMINING A CELL STATE (75) Inventors: Pontus Sandberg, Linköping (SE); Peter Östrup, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 319 days.

(21) Appl. No.: 14/408,252

(22) PCT Filed: Jun. 19, 2012

(86) PCT No.: PCT/SE2012/050677
§ 371 (c)(1),
(2), (4) Date: Dec. 15, 2014

(87) PCT Pub. No.: WO2013/191600
PCT Pub. Date: Dec. 27, 2013

(65) Prior Publication Data
US 2015/0181446 A1 Jun. 25, 2015

(51) Int. Cl.
*H04W 24/06* (2009.01)
*H04W 24/04* (2009.01)
(Continued)

(52) U.S. Cl.
CPC ........... *H04W 24/06* (2013.01); *H04W 24/04* (2013.01); *H04W 52/0212* (2013.01);
(Continued)

(58) Field of Classification Search
CPC ..... H04W 24/08; H04W 88/08; H04W 24/04; H04W 72/0486; H04W 24/02;
(Continued)

(56) References Cited

U.S. PATENT DOCUMENTS 8,750,856 B2* 6/2014 Kumar .................. H04W 24/04
340/635
8,868,063 B2* 10/2014 Wang .................... H04W 24/10
455/405

(Continued)

FOREIGN PATENT DOCUMENTS

EP 2 139 278 A1 12/2009
EP 2 568 734 A1 3/2013
(Continued)

OTHER PUBLICATIONS

"Clarification of Self-Healing at RAN," 3GPP TSG-RAN WG3 Meeting #74, R3-112773, XP050566014, Nov. 14-18, pp. 3.
(Continued)

*Primary Examiner* — Jung-Jen Liu
(74) *Attorney, Agent, or Firm* — Patent Portfolio Builders, PLLC (57) ABSTRACT A method in a radio access node performs a sleepy cell test which can determine a cell state for a cell served by a radio access node. Fulfilment of a predetermined triggering condition is detected in a radio access node. Following detection of the fulfilled triggering condition, one or more user equipment to be paged is determined. The radio access node initiates a page response timer period and performs paging of the user equipment until there is time out of the timer period or a page response is received from the one or more user equipment. The paging responses received while performing the step of paging the user equipment is assessed. A cell state alert message reflecting the result from the paging is generated and sent to a receiving entity. Related radio access nodes configured to carry out the sleepy cell test and methods are disclosed.

15 Claims, 5 Drawing Sheets

(51) Int. Cl.
*H04W 52/02* (2009.01)
*H04W 68/00* (2009.01)
*H04W 88/08* (2009.01)
*H04W 24/08* (2009.01)

(52) U.S. Cl.
CPC .......... *H04W 68/005* (2013.01); *H04W 24/08* (2013.01); *H04W 68/00* (2013.01); *H04W 88/08* (2013.01); *Y02B 60/50* (2013.01)

(58) Field of Classification Search
CPC . H04W 52/0206; H04W 52/02; H04W 16/08; H04W 28/08; H04M 1/00; Y02B 60/144; G06F 1/3206; G06F 1/329; G06F 9/4825
See application file for complete search history.

(56) References Cited

U.S. PATENT DOCUMENTS

| | | | | |
|---|---|---|---|---|
| 9,204,315 | B2* | 12/2015 | Sridhar | H04W 24/02 |
| 2010/0234006 | A1* | 9/2010 | Vadlamudi | H04W 24/04 455/418 |
| 2011/0037601 | A1* | 2/2011 | Kumar | H04W 24/04 340/635 |
| 2012/0021735 | A1* | 1/2012 | Maeder | H04W 52/0216 455/422.1 |
| 2012/0028674 | A1* | 2/2012 | Zhao | H04W 24/02 455/522 |
| 2012/0033611 | A1* | 2/2012 | Wu | H04W 24/02 370/328 |
| 2012/0320766 | A1* | 12/2012 | Sridhar | H04W 24/02 370/252 |
| 2013/0036428 | A1* | 2/2013 | Lei | G06F 1/3206 719/318 |
| 2013/0244736 | A1* | 9/2013 | Ho | H04W 52/0251 455/574 |
| 2014/0155078 | A1* | 6/2014 | Balageas | H04W 24/02 455/452.1 |
| 2015/0173039 | A1* | 6/2015 | Rune | H04W 52/0216 370/311 |

FOREIGN PATENT DOCUMENTS

| | | |
|---|---|---|
| WO | WO 2011/019519 A1 | 2/2011 |
| WO | WO 2011/157164 A1 | 12/2011 |

OTHER PUBLICATIONS

"Potential Solutions for Self Healing," Huawei, 3GPP TSG-RAN WG3 #75, R3-120128, XP050566499, Feb. 6-10, 2012, pp. 1-3.

Office Action in EP application No. 12879540.8 mailed Jun. 15, 2015, pp. 9.

International Search Report, PCT Application No. PCT/SE2012/050677, Jun. 14, 2013.

Written Opinion of the International Searching Authority, PCT Application No. PCT/SE2012/050677, Jun. 14, 2013.

3GPP, Technical Specification, "3rd Generation Partnership Project; Technical Specification Group Radio Access Network; Evolved Universal Terrestrial Radio Access Network (E-UTRAN); S1 Application Protocol (S1AP) (Release 8)", 3GPP TS 36.413 V8.10.0 (Jun. 2010), 217 pp.

* cited by examiner

METHODS AND RADIO ACCESS NODE FOR DETERMINING A CELL STATE

CROSS REFERENCE TO RELATED APPLICATION

This application is a 35 U.S.C. §371 national stage application of PCT International Application No. PCT/SE2012/050677, filed on 19 Jun. 2012, the disclosure and content of which is incorporated by reference herein in its entirety. The above-referenced PCT International Application was published in the English language as International Publication No. WO 2013/191600 A1 on 27 Dec. 2013.

TECHNICAL FIELD

The present invention relates to a method in a radio access node for determining a cell state for a cell served by the radio access node. The invention also relates to a radio access node configured to perform the method. Furthermore, the invention relates to a method in a core network node for determining a cell state for a cell served by a radio access node.

BACKGROUND

In a typical cellular radio system, wireless terminals communicate via a radio access network, RAN, to one or more core networks. The wireless terminals can be mobile stations or user equipment units, UE, such as portable, pocket, hand-held, computer-included, or car-mounted mobile devices which communicate voice and/or data with radio access network, e.g., mobile telephones and laptops with wireless capability.

The RAN covers a geographical area which is divided into cell areas, with each cell area or group of cell areas being served by a radio access node. A cell is a geographical area where radio coverage is provided by equipment at the radio access node. Each cell is identified by an identity within the local radio area. The radio access nodes communicate over the air interface with the UE within the cells served by the node.

The Universal Mobile Telecommunications System, UMTS, is a third generation mobile communication system, which evolved from the Global System for Mobile Communications, GSM, and is intended to provide improved mobile communication services based on Wideband Code Division Multiple Access, WCDMA, access technology. UTRAN is essentially a radio access network using wideband code division multiple access for user equipment units, UEs. The Third Generation Partnership Project, 3 GPP, has undertaken to evolve further the UTRAN and GSM based radio access network technologies. Specifications for the Evolved Universal Terrestrial Radio Access Network, E-UTRAN, are ongoing within the 3GPP. Another name used for E-UTRAN is the Long Term Evolution, LTE, Radio Access Network, RAN.

Long Term Evolution RAN is a 3GPP radio access technology wherein a flat architecture is used with a singled type of nodes connected directly to a core network. The LTE RAN comprises evolved radio access nodes, e.g., evolved NodeBs or eNodeBs or eNBs, providing evolved UTRA user-plane and control-plane protocol terminations toward the user equipment. A common implementation of an eNodeB is a three-sector site, where the eNodeB includes equipment for handling transmissions in three cells. However, other implementations can be found as well. The eNodeB hosts functions for radio resource management, mobility management and user plane functions, among others. The eNodeB is connected to the core-network by means of the S1 interface.

Within the LTE RAN there may be occurrences of cell outage, i.e., cells that due to hardware or software engineering faults suffer from loss of call processing. The lack of processing of traffic in a cell causes an inability in the node to process incoming calls or handle data for ongoing calls. A cell outage is a state when the cell cannot handle any of the offered traffic in the area covered by the cell. There are multiple reasons for a cell outage, e.g., hardware and software failures (radio board failure, channel processing implementation error etc), external failures such as power supply or network connectivity failures, or even erroneous configuration. When a cell is in an outage state, the cell cannot support any users in its vicinity. For the operators of wireless access networks this is an undesirable consequence as potential revenue is missed from the unsupported traffic and also customer satisfaction is damaged. It is important to be able to detect the state of cell outage promptly to be able mitigate the effect of the cell outage and to redirect the users to other cells within the radio access node or to other radio access nodes.

A cell outage, i.e. one or more malfunctioning radio cells of a base station, e.g. a LTE eNB, may be detected by the base station associated with the affected radio cell by internal surveillance of processing boards and RF components of the base station. Some cell outage cases may also be detected by Operations Support System (OSS) functions through performance counters and/or alarms. By investigating a portion of the traffic related counters and their recent history, one can detect when a cell might have gone into a state of cell outage, a so called "Sleepy Cell". However, with the presently available solutions, detection of cell outage may be delayed for hours or even days. It is often through long term performance analysis and subscriber complaints that the outages are detected. Currently, discovery and identification of some errors may involve manual analysis and may require unplanned site visits, which makes cell outage detection a costly task.

There is a need for improved solutions for determining a cell state in a radio access network.

SUMMARY

It is an object of an embodiment of the invention to provide improved solutions in a radio access network for evaluating and determining a state for a cell served by a radio access node.

In accordance with a method embodiment of the invention, fulfilment of a predetermined triggering condition is detected in a radio access node in a first step of the embodiment. Following detection of the fulfilled triggering condition, one or more user equipment to be paged is determined. The radio access node initiates a page response timer period and performs paging of the user equipment until there is time out of the timer period or a page response is received from the one or more user equipment. The paging responses received whilst performing the step of paging the user equipment is assessed. When no page responses have been received, a cell state alert message reflecting this result from the paging is generated and sent to a receiving entity.

The selection of user equipment to page as part of the cell state assessment in the radio access node may be determined by the radio access node itself, but may also in another embodiment of the invention be determined by a core network entity receiving a network paging request from the radio access node. The core network entity returns a paging message reflecting a set of user equipment to page that is received in the radio access node.

An embodiment of a radio access node configured to carry out a cell state test for a cell served by the radio access node comprises a core network communication unit for exchange of messages with one or more core network entities. The radio access node further comprises a radio transceiver for sending paging messages and receiving page responses from one or more user equipment in a cell handled by the radio access node. A processor in the radio access node is configured to process test triggering information, that is, information used to evaluate fulfillment of a predetermined triggering condition. The processor is further configured to set a page response timer period for performing a paging procedure as part of the cell state test. The processor is configured to perform assessment of the user equipment page response and to generate a cell state alert message.

Another embodiment of the inventive method concerns a method in a radio access node for determining a cell state for a cell handled by the radio access node. A sleepy cell assumption is formed in a first step of the embodiment. A set of user equipment to be paged is selected and user equipment paging messages are sent from the radio access node assumed to handle these user equipment(s). The response of the paging is processed to confirm or reject the sleepy cell assumption.

Embodiments of the invention are advantageous for evaluating and determining the state for a cell served by a radio access node. The disclosed technology provides a simple and effective way to conclude sleepy cell state, providing a more accurate understanding of current cell state and shortening the time to trigger an accurate alarm when there is a cell outage. Embodiments of the invention contribute to faster recovery from the sleepy cell state.

BRIEF DESCRIPTION OF THE DRAWINGS

FIG. 5 is a flow chart illustrating an embodiment of method steps in a core network node FIG. 6 signaling diagrams for sleepy cell tests involving core network entities
  a. is a signaling diagram illustrating a sleepy cell test where the sleepy cell assumption is rejected
  b. is a signaling diagram illustrating a sleepy cell test where the sleepy cell assumption is confirmed FIG. 7 signaling diagrams for sleepy cell tests involving an access node entity
  a. is a signaling diagram illustrating a sleepy cell test where the sleepy cell assumption is rejected
  b. is a signaling diagram illustrating a sleepy cell test where the sleepy cell assumption is confirmed

DETAILED DESCRIPTION OF THE DRAWINGS

Figure 1:
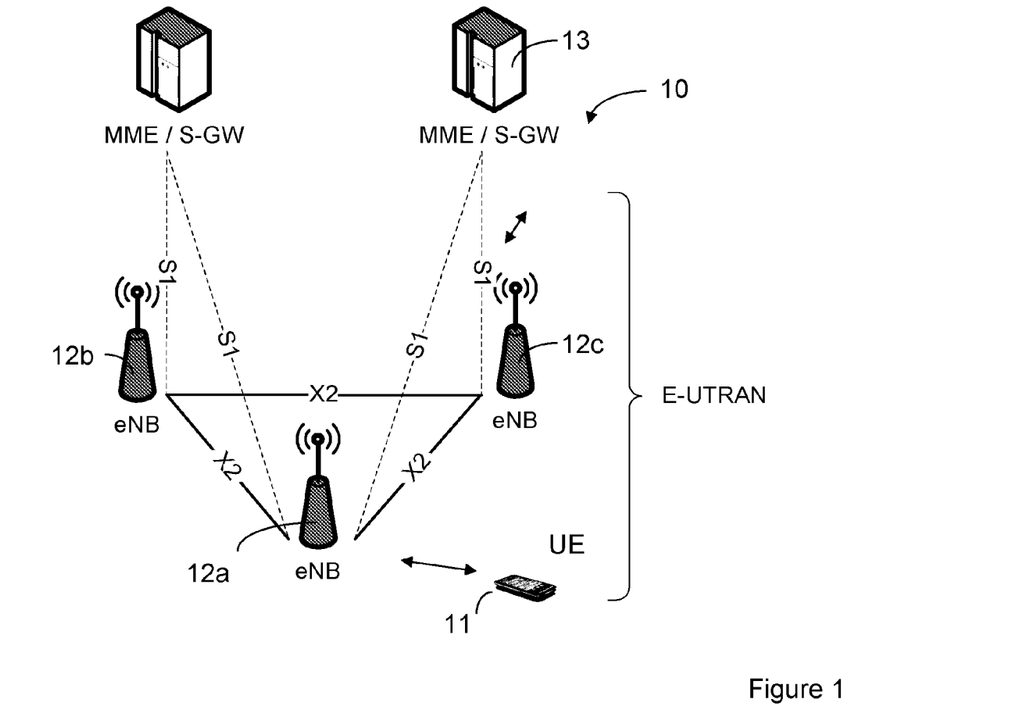
FIG. 1 is a schematic view of an exemplary Long Term Evolution, LTE, network

FIG. 1 shows a schematic view of an exemplary E-UTRAN/LTE network 10, wherein the invention may be implemented. An eNodeB 12 is connected to a Serving Gateway, S-GW, and the Mobility Management Entity 13, MME, by means of the S1 interface. eNodeBs 12a, b c are connected to one another over the X2 interface. The following detailed description of the invention in a LTE network is merely an exemplification of a network suitable for carrying out the invention, but is non-limiting to the invention. The invention may be performed in any other type of network configuration involving call processing in cells handled by radio access nodes, wherein a loss of call processing capability may occur.

Figure 2:
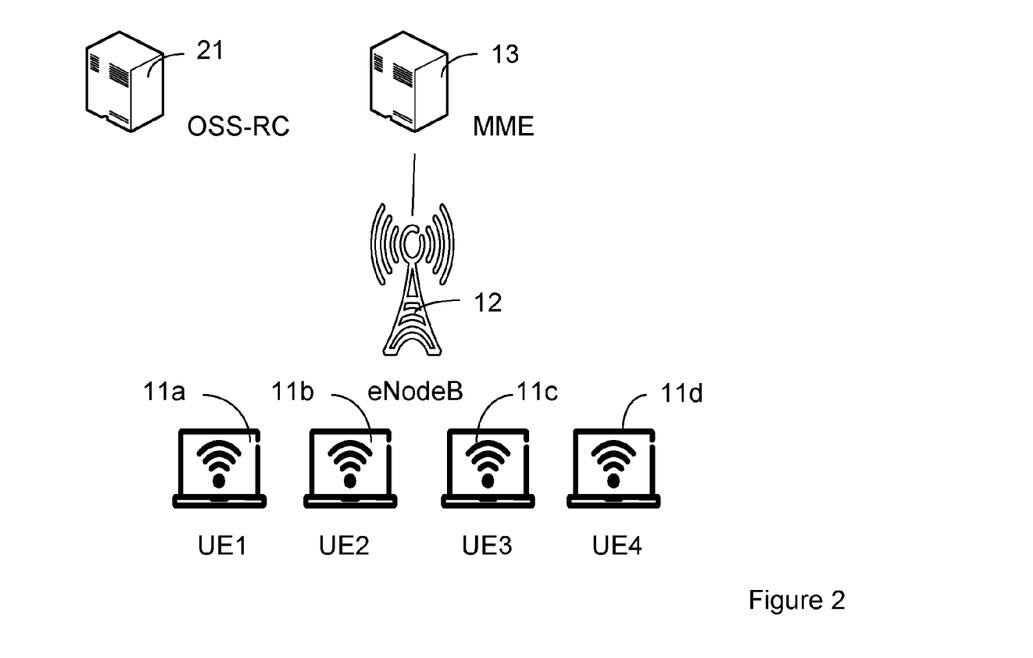
FIG. 2 is a schematic view of a LTE RAN and control plane core network

FIG. 2 is an overview of a Long Term Evolution, LTE, Radio Access Network, RAN, and control plane, CP, core network consisting in this case of one eNodeB 12 with its connected Mobility Management Entity, MME 13, Operation and Support System, OSS 21, and using the S1 application protocol, S1-AP, interface for control signalling to the core network. In the disclosed situation, there are four user equipments, UEs 11a-d, in idle mode within one or more active cells of the radio access node 12, here represented as an eNodeB. The UEs 11a-d are, from the MME 13 perspective, listed as last known to be present in said cells of the radio access node 12.

Figure 3:
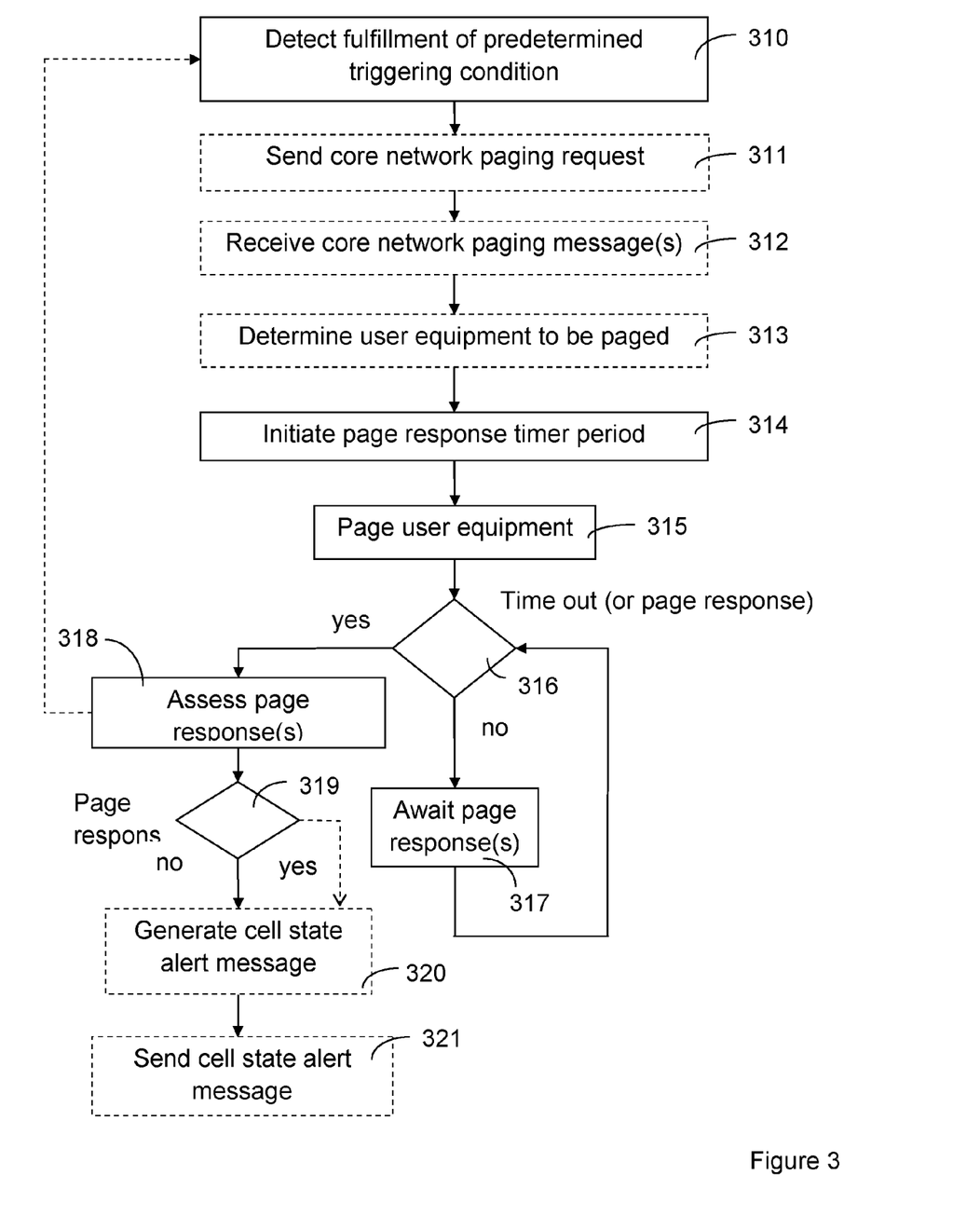
FIG. 3 is a flow chart illustrating an embodiment of method steps in a radio access node

FIG. 3 discloses basic, representative, non-limiting flow chart including example steps which can be performed in an exemplary embodiment of the invention. Optional steps in the embodiment are depicted with dashed lines. The method steps are performed in a radio access node, e.g., an eNodeB 12, in a radio access network. The disclosed exemplary method is a method for performing sleepy cell test by paging one or more User Equipments, UEs, in a radio access network, e.g. the networks disclosed in FIG. 1 or 2.

In a first step, step 310, a predetermined triggering condition is detected, i.e., a condition indicating that one or more cells in the radio access network, RAN, suffers from loss of call processing. This state of is commonly denominated as "sleeping cell" or "sleepy cell". In the following, the term "sleepy cell" will be used to describe a cell that cannot handle offered traffic in the area covered by the cell. A triggering mechanism such as an eNodeB internal cell supervision mechanism detects no incoming traffic on the Physical Random Access Channel, PRACH. Other triggering conditions and mechanisms for detecting these conditions are within the scope of the invention. The absence of traffic on the PRACH is just an exemplification of one possible triggering condition to initiate a sleepy cell test according to the disclosed embodiment of the invention.

In a succeeding step 313, one or more user equipment, UE, to be paged in the cell with the suspected sleepy cell state is determined. In an optional step 311, preceding step 313, the radio access node may send a paging request to the core network; in a preferred embodiment of the invention to the MME. Following the paging request, the eNodeB awaits a response from the core network/MME and proceeds to step 313 following receipt of a core network paging message in step 312. The core network paging message is an ordinary paging message indicating one or more UEs to include in the paging. Selection of the UEs to page may be based on an MME internal selection algorithm. The MME UE selection mechanism may, for example, determine to page a certain percentage of the UEs last known to have been present in the cell or the eNodeB or it may start sequential paging of all UEs last known to have been present in the cell or eNodeB. Once the UEs have been selected a normal paging message is sent to the eNodeB. The paging request from the radio access node to the core network expresses a sleepy cell assumption for the cell fulfilling the triggering conditions for loss of call processing.

In a step 314, a page response timer period is initiated in the radio access node. The page response timer period may be set in a supervision timer in the eNodeB. The eNodeB performs paging of the selected UEs by forwarding the received paging message on the paging channel, e.g., over the Physical Downlink Share Channel, PDSCH. In the disclosed flow chart in FIG. 3, the paging of user equipment is illustrated as a sequential step to the initiation of the page response timer period. However, it will be obvious to the person skilled in the art that these two steps are performed essentially simultaneously.

The paging of selected UEs is performed in step 315 until the paged UEs have responded with service request or until the timer period has expired. The flow chart in FIG. 3 illustrates the situation where paging is allowed to continue until the timer period expires or a page response is received in step 317 in the form of a page request from any of the paged UEs. If a page response in the form of a page request is received from any of the paged UEs, the test may be considered as completed even though the timer period has not yet expired. In the absence of a page response, the eNodeB performing the page will continue to await one or more page responses in step 317 from the UEs selected for the test procedure. In a power effective embodiment of the invention, the MME pages the selected UEs in a sequential way, limiting the number of pages and load on the eNodeB.

Following time out of the supervision timer or a page response in step 316, an assessment of the page response(s) will be performed in step 318. Optionally, the process of determining a cell state as illustrated in FIG. 3 may be re-initiated at step 310 detecting fulfilment of predetermined triggering condition whilst performing the step of assessing page response(s) or following a a predetermined period of time. Upon confirmation that no page responses has been received instep 319, a message with a cell state alert will be generated in step 320 and sent to the OSS and/or the MME in step 321. When it is determined that a page response is received in step 319, the cell state alert message in step 320 may optionally be produced whereupon the self test is concluded. However, following UE attach based on sent paging messages, the procedure for self test will be re-initiated at step 310. A new S1-AP message could be initiated from the eNodeB toward the MME to mark the stop of the test. In a preferred embodiment of the invention, the supervision timer is not stopped when a page response in the form of a service request is received. The message to the MME is sent at time-out of the supervision timer and should include a result of the self test. In FIG. 3, the option of allowing time out of the timer period even upon receipt of a page response is indicated as an option in step 316. The message to the MME indicates that the MME may stop paging selected UEs If the MME receives a cell state alert message, as illustrated in step 321, that marks the stop of the self test and the message includes a result that indicates that the cell is healthy, the MME may initiate an additional S1-AP message toward the eNodeB if it has not received any page response from any of the UEs selected for paging. This additional S1-AP message will allow the radio access network to issue an alarm that the paging channel may suffer from an inability to process calls.

Figure 4:
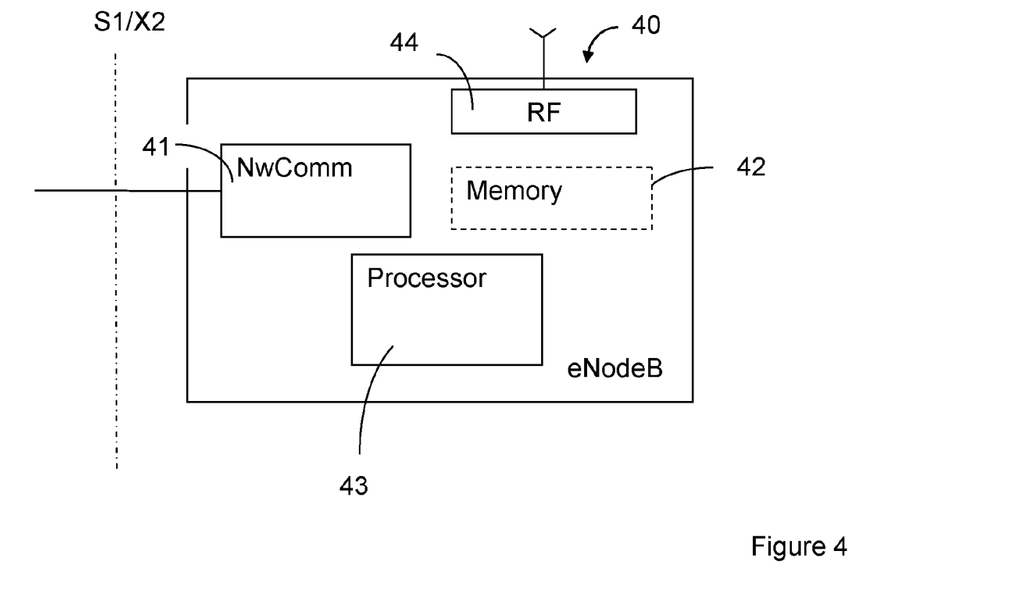
FIG. 4 is a block diagram of a radio access node according to an embodiment of the invention

FIG. 4 illustrates a radio access node 40 configured to initiate and/or participate in a cell state test for a cell served by the radio access node. The radio access node 40 comprises a communication unit NwComm 41 configured for communicating over the S1 interface with a core network entity, e.g., the MME. The radio access node 40 further comprises a radio transceiver 44 configured for forwarding of the paging messages to UEs in a cell, and receipt of page responses from one or more user equipment in a cell. A processor 43 in the radio access node 40 is configured to process test triggering information, to determine fulfillment of test triggering condition, to set a page response timer period, to assess user equipment page response and to generate a cell state alert message. The NwComm unit 41 is configured to transmit a cell state alert message to a receiving entity. The radio access node 40 may also comprise a memory 42 storing information on the UEs last present in the cells of the eNodeB. When the sleepy cell test is performed as a eNodeB test, the information in the memory 42 will be extracted to select the set of UEs to involve in the paging procedure.

Figure 5:
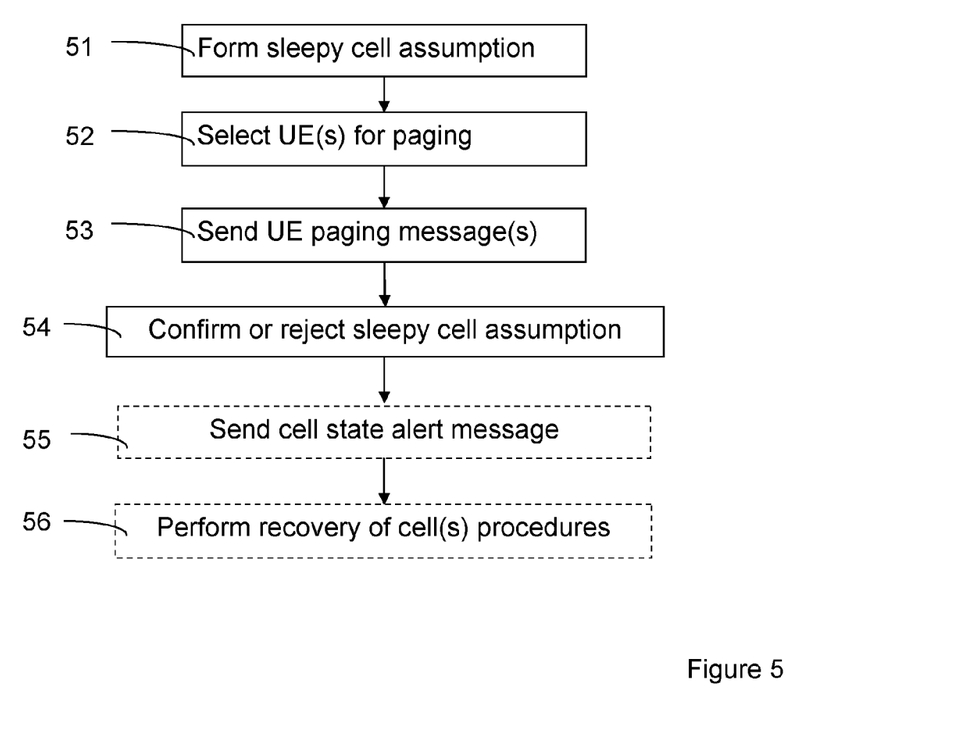

FIG. 5 illustrates method steps of an embodiment of the invention in a radio access node. In a first step 51, a sleepy cell assumption is formed in the radio access node. Such a sleepy cell assumption may be formed following fulfillment of a triggering condition for a suspected sleepy cell.

In a subsequent step 52, the radio access node selects a set of UEs for paging during a sleepy cell test to evaluate the sleepy cell assumption. The UEs may be selected based on last known presence in the cell. Applying the method to the network configuration of FIG. 2, there are four UEs 11a-d in RRC_IDLE state. These UEs 11a-d are from the MME perspective listed as last known to be present in the radio access node, here represented as eNodeB 12. The radio access node 12 may obtain information from the MME 13 of these UEs 11a-d last present within cells of the node or in the suspected sleepy cell. The radio access node 12 may also obtain information from the MME 12 on a subset of one or more UEs last present in the MME to include in the paging procedure.

In step 53 a paging message for the selected set of UEs is sent from the radio access node handling the suspected sleepy cell. The radio access node 12 performs the paging and generates a cell state alert message as previously described for the embodiment according to FIG. 3.

When the radio access nodes 12 role in the sleepy cell paging procedure is concluded, the radio access node 12 confirms or rejects 54 the sleepy cell assumption. A cell state alert message may optionally be sent 55 to an operation or support system or to a core network node. This cell state alert message may include information that a page request has been received and that the sleepy cell assumption is to be rejected, but the cell state alert message may also include information relating to the absence of a paging response from any of the UEs in the suspected sleepy cell, which may be interpreted as a confirmation that the sleepy cell assumption is correct. In a preferred embodiment of the invention, the cell state alert message is a S1-AP message.

In yet an optional step 56 the embodiment of a method in a radio access node includes performing procedures for recovery of one or more cells for which the sleepy cell assumption has been confirmed.

FIGS. 6a-7b illustrate signaling sequences for sleepy cell tests performed in an exemplary LTE network, wherein the core network node is represented by a Mobility Management Entity, MME 13 and the radio access node is represented by an eNodeB 12. The MME 13 could be substituted by core network entities performing the task of sending a paging message, similarly the eNodeBs 12 could be replace by other radio access nodes when the invention is embodied in other network configurations than an LTE network.

Figure 6A:
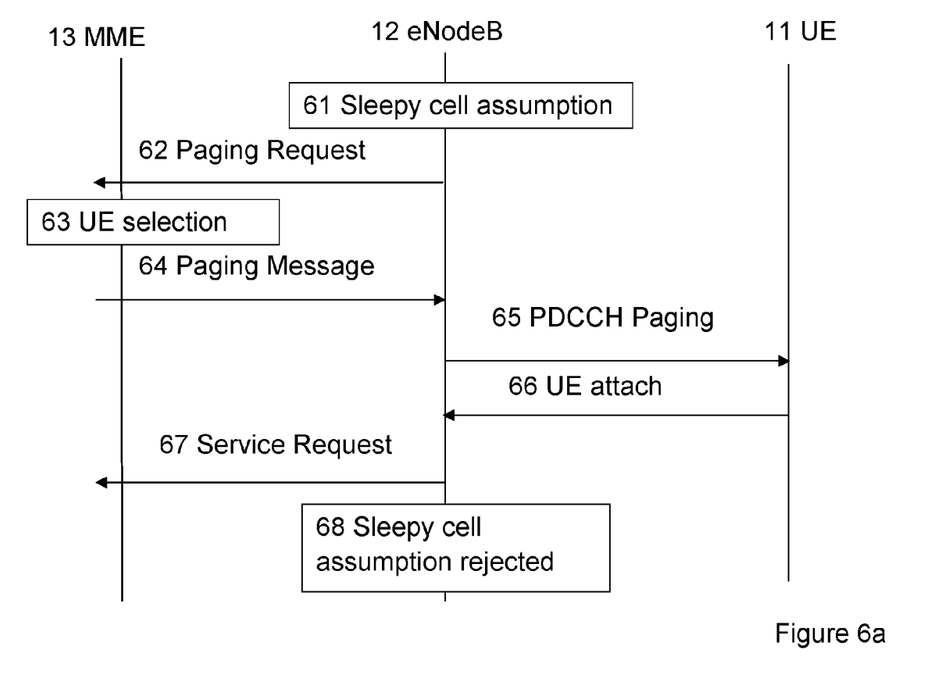

In FIG. 6a, a sleepy cell assumption 61 is formed in the eNodeB following fulfillment of a triggering condition in the eNodeB. The eNodeB 12 initiates the sleepy cell test by sending a paging request 62 to the MME 13. Signaling between the eNodeB 12 and the MME 13 is performed over the S1 interface by means of an S1 application protocol, S1-AP. The MME 13 selects 63 a set of UE 11 to involve in the sleepy cell test based on the UEs previous presence and activity in the cell for which the sleepy cell test is to be performed. The MME sends paging messages 64 toward each of these UEs in conventional manner. The paging messages may be sent in parallel, but may also be sent sequentially with an aim to save power and limit the load on the eNodeB. The eNodeB 12 receiving the paging messages 64 over the S1 interface, forwards the paging messages to the respective UEs over the Physical Downlink Control Channel, PDCCH, as PDCCH Paging 65. A supervision timer is set in the eNodeB 12, to limit the supervision window for the sleepy cell test. In the disclosed signaling sequence, the supervision timer window is closed when the UE attach message 66 reaches the eNodeB 12. This page response from the UE, may be forwarded from the eNodeB to the MME in the form of a service request 67 originated by the UE. Following receipt of the service request 67 in the MME, the sleepy cell assumption may be rejected 68 and the sleepy cell test is concluded.

Figure 6B:
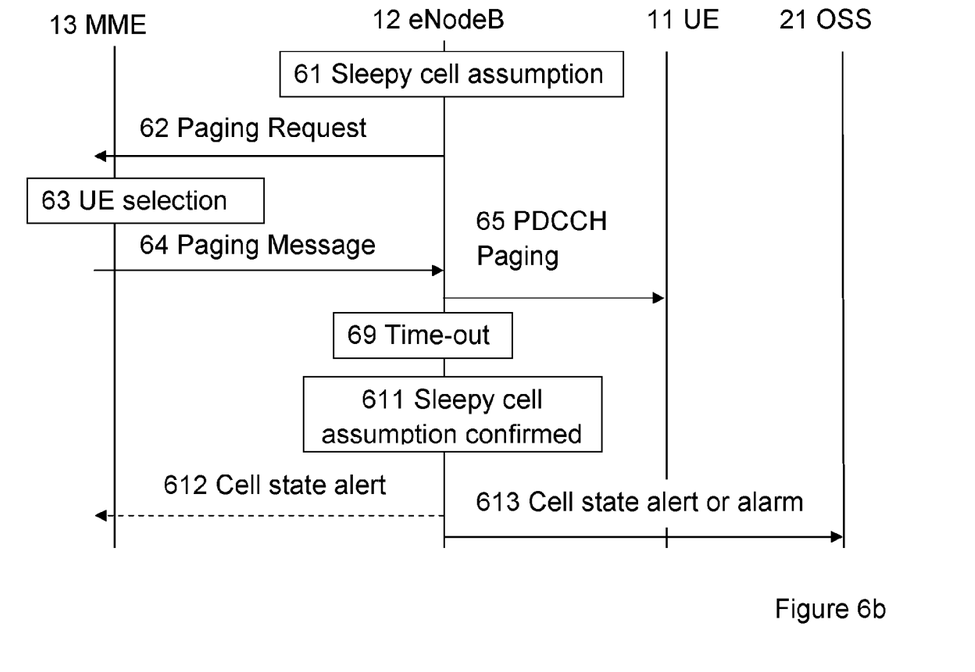

The signaling sequence in FIG. 6b, discloses the same sleepy cell assumption 61 formed in the eNodeB 12 followed by a paging request 62 and a selection of UEs 63 as already disclosed for FIG. 6a. Following the paging message 64 from the MME 13 to the eNodeB 12 and the PDCCH paging 65, the eNodeB 12 awaits a page response from the paged UEs. The supervision window closes on time-out 69 of the supervision timer whereupon the sleepy cell assumption is confirmed 611 in the eNodeB. The eNodeB 12 sends a cell state alert or alarm 613 to the OSS. As an option, a cell state alert 612 may also be sent to the MME 13 to conclude the sleepy cell test in the MME.

Figure 7A:
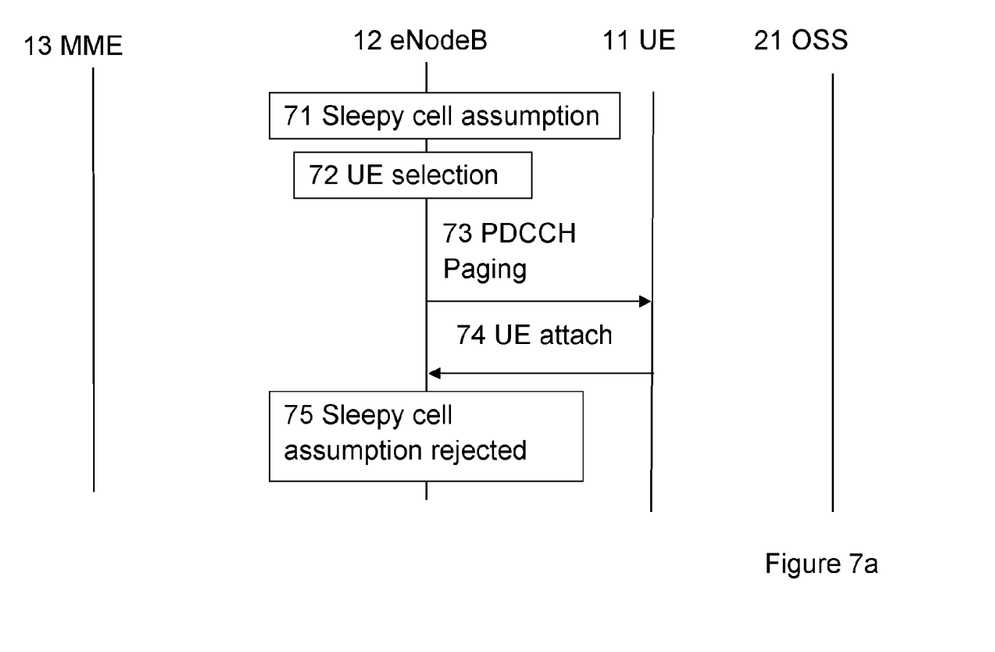

The signaling sequence in FIG. 7a, discloses a sleepy cell test initiated and performed by the eNodeB 12 without specifically involving the MME 13. The eNodeB 12 forms a sleepy cell assumption 71 following fulfillment of a triggering condition in the eNodeB. A memory in the eNodeB is configured to hold on UEs last present in the suspected sleepy cell handled by the eNodeB. Based on this information, the eNodeB 12 performs UE selection 72 and selects UEs 11 for paging. The eNodeB 12 initiates and sends an ordinary PDCCH paging message 73 to the set of UEs represented in said memory 42. The signaling sequence in FIG. 7a, discloses the situation with the sleepy cell assumption rejected 75 in the eNodeB following a page response in the form of UE attach 74 from one or more of the paged UEs in the suspected sleepy cell.

Figure 7B:
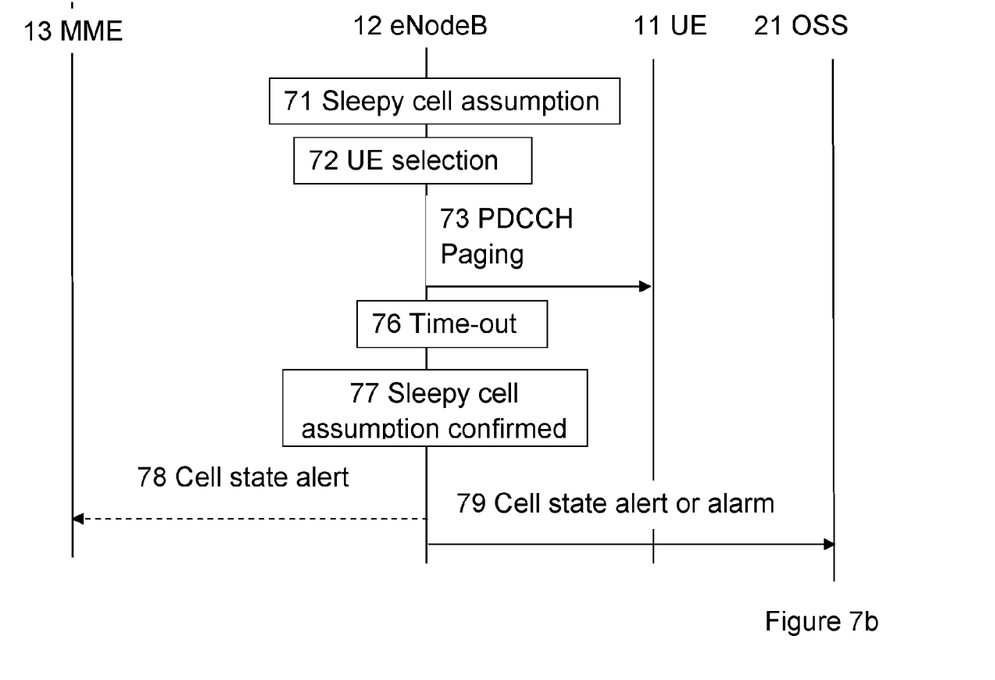

The signaling sequence in FIG. 7b, discloses a sleepy cell test initiated and performed by the eNode as in FIG. 7a including the sleepy cell assumption 71, the UE selection 72 and the PDCCH paging 73. In the disclosed signaling sequence, the supervision window in the eNodeB closes without a page response from any of the paged UEs. The supervision window closes upon time-out 76 of a supervision timer set in the eNodeB at the time of the PDCCH paging signaling. The confirmation of the sleepy cell assumption is illustrated in the MME as sleepy cell assumption confirmed 77. This confirmation following time-out of the supervision timer, results in a cell state alert or alarm 79 to the operation and support system OSS 21. The eNodeB 12 may also, optionally, send a cell state alert 78 to the MME 13

In the disclosed signaling diagrams, the term eNodeB has been used to represent a radio access node. The presentation of the signaling sequences for an eNodeB is non-limiting to the invention, and in the understanding of the invention an eNodeB should be interpreted as equivalent to a radio access node.

The invention claimed is:

1. A method in a radio access node in a radio access network for determining a cell state for a cell served by the radio access node, including the steps of:
    detecting fulfillment of a predetermined triggering condition;
    determining, in response to detection of the fulfillment of the predetermined triggering condition, one or more user equipments to be paged in the cell;
    initiating a predetermined page response timer period;
    paging the one or more user equipments;
    awaiting user equipment page response(s) from the paged one or more user equipments during the predetermined page response timer period;
    at time out of the predetermined page response timer period, assessing the user equipment page response(s) received from the paged one or more user equipments; and when not receiving the user equipment page response(s) from at least one of the paged one or more user equipments, generating a cell state alert message and sending the cell state alert message to a receiving entity.

2. The method according to claim 1, further comprising repeating the method from the step of detecting the fulfillment of the predetermined triggering condition.

3. The method according to claim 2, wherein the repeating is performed for a predetermined period of time following conclusion of the step of assessing the user equipment page response(s).

4. The method according to claim 1, wherein the receiving entity is an Operation and Support System, OSS.

5. The method according to claim 1, wherein the receiving entity is a core network entity.

6. The method according to claim 1, following the detection of the fulfillment of the predetermined triggering condition further comprising the steps of:
    sending a core network paging request to a core network entity; and
    receiving a core network paging message from the core network entity.

7. The method according to claim 6, wherein the one or more user equipments to be paged are determined from information included in a S1-AP paging message.

8. The method according to claim 1, wherein the method is simultaneously performed for all cells served by the radio access node.

9. The method according to claim 1, wherein the user equipment page response(s) are service requests.

10. The method according to claim 1, wherein the cell state alert message is generated and sent for any result from the step of assessing the user equipment page response(s).

11. A radio access node configured to initiate a cell state test for a cell served by the radio access node in a radio access network, the radio access node comprising:
    a core network communication unit configured for messaging with one or more core network entities;
    a radio transceiver configured for paging one or more user equipments in the cell in response to determination of fulfillment of a test triggering condition and for receiving page response(s) from the paged one or more user equipments in the cell; and a processor configured to process test triggering information, to determine fulfillment of the test triggering condition, to set a page response timer period, to assess the page response(s) from the paged one or more user equipments and to generate a cell state alert message.

12. The radio access node according to claim 11 further comprising:
a memory configured to store information on a number of user equipments last known to be present in the cell served by the radio access node.

13. A method for assessing a cell state in a radio access node comprising the steps of:
forming a sleepy cell assumption;
selecting a set of user equipments, UEs, for paging in response to the formation of the sleepy cell assumption;
sending user equipment paging message(s) to the selected set of UEs;
rejecting the sleepy cell assumption on receipt of a UE paging response from at least one user equipment of the selected set of UEs; and/or
confirming the sleepy cell assumption at time out of a predetermined page response timer period when not receiving the UE paging response from at least one user equipment of the selected set of UEs.

14. The method according to claim 13, further comprising the step of:
sending a cell state alert message to an operation and support system.

15. The method according to claim 13, further comprising the step of:
performing one or more predetermined procedures for recovery from a sleepy cell state.

* * * * *